(12) United States Patent
Gustafsson et al.

(10) Patent No.: US 12,490,369 B2
(45) Date of Patent: Dec. 2, 2025

(54) PLATE-TYPE OZONE GENERATOR AND SYSTEM FOR GENERATING OZONE

(71) Applicant: ARROW LAKE AB, Malmö (SE)

(72) Inventors: Claes Gustafsson, Malmö (SE); Ali Jehanfard, Bara (SE); Martin Belohorka, Lomma (SE); Arash Golshenas, Malmö (SE)

(73) Assignee: ARROW LAKE AB, Malmö (SE)

( * ) Notice: Subject to any disclaimer, the term of this patent is extended or adjusted under 35 U.S.C. 154(b) by 3 days.

(21) Appl. No.: 18/695,577

(22) PCT Filed: Sep. 27, 2022

(86) PCT No.: PCT/IB2022/059168
§ 371 (c)(1),
(2) Date: Mar. 26, 2024

(87) PCT Pub. No.: WO2023/052986
PCT Pub. Date: Apr. 6, 2023

(65) Prior Publication Data
US 2024/0414832 A1    Dec. 12, 2024

(30) Foreign Application Priority Data
Sep. 28, 2021  (SE) .................................. 2130270-8

(51) Int. Cl.
*H05H 1/24*  (2006.01)
(52) U.S. Cl.
CPC ....... *H05H 1/2437* (2021.05); *H05H 2242/10* (2013.01); *H05H 2245/15* (2021.05)
(58) Field of Classification Search
CPC ............. H05H 1/2437; H05H 2245/15; H05H 2242/10
See application file for complete search history.

(56) References Cited

U.S. PATENT DOCUMENTS 2,260,831 A    10/1941  Daily
10,336,612 B2  7/2019   Arlemark
(Continued)

FOREIGN PATENT DOCUMENTS

CN    213771342 U  *  7/2021
CN    115367710 A  * 11/2022  ............. C01B 13/11
(Continued)

OTHER PUBLICATIONS

European Patent Office, International Search Report, Application No. PCT/IB2022/059168, mailed Feb. 24, 2023, 4 pages.
(Continued)

*Primary Examiner* — Adam D Houston
(74) *Attorney, Agent, or Firm* — ZIEGLER IP LAW GROUP, LLC.

(57) ABSTRACT

A plate-type ozone generator includes a first ground electrode plate, second ground electrode plate, central plate and reactor middle frame arranged between first end and second end of plate-type ozone generator, wherein the central plate houses the reactor middle frame that is moveable from centre of central plate. The frame includes a high-voltage electrode plate, first dielectric barrier plate and second dielectric barrier plate, first gap being formed between first dielectric barrier plate and first ground electrode plate and second gap being formed between second dielectric barrier plate and second ground electrode plate. The first gap and second gap are filled with gas. A power source is used to charge the first ground electrode plate, second ground electrode plate, and high-voltage electrode plate. Dielectric barrier discharge occurs for generating ozone.

12 Claims, 3 Drawing Sheets

(56) References Cited

U.S. PATENT DOCUMENTS

| | | | |
|---|---|---|---|
| 12,330,935 B2 * | 6/2025 | York | H01T 19/00 |
| 2002/0006366 A1 | 1/2002 | Borgstrom | |
| 2006/0024220 A1 | 2/2006 | Orishima et al. | |
| 2018/0297844 A1 * | 10/2018 | Rodan | H05H 1/2406 |
| 2019/0206658 A1 * | 7/2019 | Roy | H01J 37/32348 |
| 2019/0322528 A1 * | 10/2019 | Liu | C01B 13/115 |
| 2024/0414832 A1 * | 12/2024 | Gustafsson | H05H 1/2437 |

FOREIGN PATENT DOCUMENTS

| | | | | |
|---|---|---|---|---|
| CN | 217921491 U | * | 11/2022 | |
| GB | 2602297 A | * | 6/2022 | A47K 3/022 |
| WO | 0220398 A1 | | 3/2002 | |
| WO | WO-2023052986 A1 | * | 4/2023 | H05H 1/2437 |

OTHER PUBLICATIONS

The International Bureau of Wipo, International Preliminary report on Patentability, Application No. PCT/IB2022/059168, mailed Apr. 11, 2024, 14 Pages.

European Patent Office, International Search Report and Written Opinion, Application No. PCT/IB2022/059168, mailed Feb. 24, 2023, 19 Pages.

Swedish Patent and Registration Office, Office Action, Application No. SE2130270-8, mailed Apr. 12, 2022, 09 Pages.

\* cited by examiner

PLATE-TYPE OZONE GENERATOR AND SYSTEM FOR GENERATING OZONE

TECHNICAL FIELD

The present disclosure relates to plate-type ozone generators. The present disclosure also relates to systems for generating ozone.

BACKGROUND

Over the past few decades, ozone technology has witnessed significant applications in fields of water treatment, air treatment, food sanitation, paper production, aquaculture, medicine, disinfection treatment, deodorization, agriculture, electronics, and the like. Typically, the ozone technology utilizes an ozone generator (for example, a tubular-type ozone generator, a plate-type ozone generator, or similar) to generate ozone, wherein the ozone is generated by a dielectric barrier discharge between two electrodes that are separated by an insulating dielectric barrier.

However, existing apparatuses and techniques utilized for generating the ozone are associated with several limitations. Firstly, the existing apparatuses and techniques are not well-suited for a large scale ozone generation which may be essentially required for applications such as the water treatment. Moreover, the existing apparatuses and techniques are complex and lack a systematic approach for generating the ozone. Secondly, existing apparatuses comprise multiple parts that are required to be individually assembled. In an example, some existing plate-type ozone generators have multiple screws and/or seals that are arranged to obtain a conduit set-up in said ozone generators. This increases an assembling time for said ozone generators.

Therefore, in light of the foregoing discussion, there exists a need to overcome the aforementioned drawbacks associated with existing apparatuses and techniques utilized for generating ozone.

SUMMARY

One object of the teachings herein is to overcome or at least mitigate the problems of the prior art.

According to one aspect, the object is achieved by providing a plate-type ozone generator comprising:
  a first ground electrode plate arranged at a first end of the plate-type ozone generator, a second ground electrode plate arranged at a second end of the plate-type ozone generator, a central plate and a reactor middle frame arranged in between the first end and the second end at a first predefined distance from both the first ground electrode plate and the second ground electrode plate, the central plate and the reactor middle frame being parallel to both the first ground electrode plate and the second ground electrode plate, wherein the central plate has a through-hole to house the reactor middle frame that is arranged at a centre of the central plate and is moveable up to a second predefined distance from the centre, the reactor middle frame comprises a high-voltage electrode plate parallelly arranged between a first dielectric barrier plate and a second dielectric barrier plate, a first gap being formed between the first dielectric barrier plate and the first ground electrode plate and a second gap being formed between the second dielectric barrier plate and the second ground electrode plate,
  further wherein when the plate-type ozone generator is in operation, the first gap and the second gap are filled with a gas, a power source is used to charge the first ground electrode plate, the second ground electrode plate, and the high-voltage electrode plate, and a dielectric barrier discharge (DBD) occurs to ionize the gas for generating ozone.

Embodiments of the present disclosure enable the plate-type ozone generator to allow for a large scale ozone generation which may be essentially required for applications such as the water treatment. This is due to a simple construction of the plate-type ozone generator wherein a systematic approach is utilized for generating ozone. Such a plate-type ozone generator has built-in provisions (such as conduits) for supplying a gas in the plate-type ozone generator and for obtaining the ozone from the plate-type ozone generator. This considerably reduces an assembling time for the plate-type ozone generator. The plate-type ozone generator is safe, reliable and can be fabricated with ease.

In one embodiment, a given dielectric barrier plate is arranged in a proximity of the high-voltage electrode plate.

In one embodiment, the high-voltage electrode plate and a given dielectric barrier plate are circular in shape, a given ground electrode plate has an annular recess therein, and wherein a diameter of the given dielectric barrier plate is greater than a diameter of the high-voltage electrode plate and an outer diameter of the annular recess of the given ground electrode plate.

In one embodiment, the given dielectric barrier plate comprises a plurality of radial spokes that are spaced apart from each other.

In one embodiment, the central plate comprises an insulated port for providing an electrical connection between the high-voltage electrode plate and the power source.

In one embodiment, a given ground electrode plate is fabricated as a metallic frame, wherein the metallic frame comprises:
  a plurality of conduits for at least supplying the gas into the first gap and the second gap within the plate-type ozone generator and obtaining the ozone from the plate-type ozone generator; and
  a plurality of channels for circulating water or air to cool the plate-type ozone generator.

In one embodiment, the metallic frame is capable of accommodating power supply cables and/or the power source.

In one embodiment, the metallic frame comprises a plurality of t-slots to enable fastening of a plurality of electronic elements with the metallic frame.

According to another aspect, the object is achieved by providing a system for generating ozone, the system comprising:
  at least one plate-type ozone generator according to the aforementioned aspect;
  a gas source for supplying a gas to be filled into a first gap and a second gap within the at least one plate-type ozone generator, the gas source being fluidically coupled to the at least one plate-type ozone generator;
  a cooling arrangement for circulating water or air to cool the at least one plate-type ozone generator;
  an ozone collection unit for obtaining the ozone from the at least one plate-type ozone generator, the ozone collection unit being fluidically coupled to the at least one plate-type ozone generator; and
  a power source for driving the at least one plate-type ozone generator.

According to still another aspect, the object is achieved by providing a plate-type ozone generator comprising a ground plate cooling manifold, a ground electrode plate, a dielectric barrier plate, a high voltage electrode plate, arranged in sequence and each parallel to each other.

The ground plate cooling manifold comprises inlet and outlet conduits extending therethrough and parallel to the plane of the ground plate cooling manifold.

The ground plate cooling plate has an annular recess and at least one central hole, each on the side facing the high voltage electrode plate.

The ground electrode plate is disc shaped and sized to fit within the ambit of the annular recess and has at least one central plate hole arranged to be in alignment with the at least one central hole, the ground electrode plate being arranged in contact with the ground plate cooling plate.

The inlet conduit has a 'T' junction with a recess conduit that communicates with the annular recess, The outlet conduit has a 'T' junction with the at least one central hole, The dielectric plate has radial spokes defining through passages communicating between the annular recess and the at least one central plate hole.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following drawings wherein.

DETAILED DESCRIPTION

The following detailed description illustrates embodiments of the present application and ways in which they can be implemented. Although some modes of carrying out the present teachings have been disclosed, those skilled in the art would recognize that other embodiments for carrying out or practising the present teachings are also possible.

Figure 1:
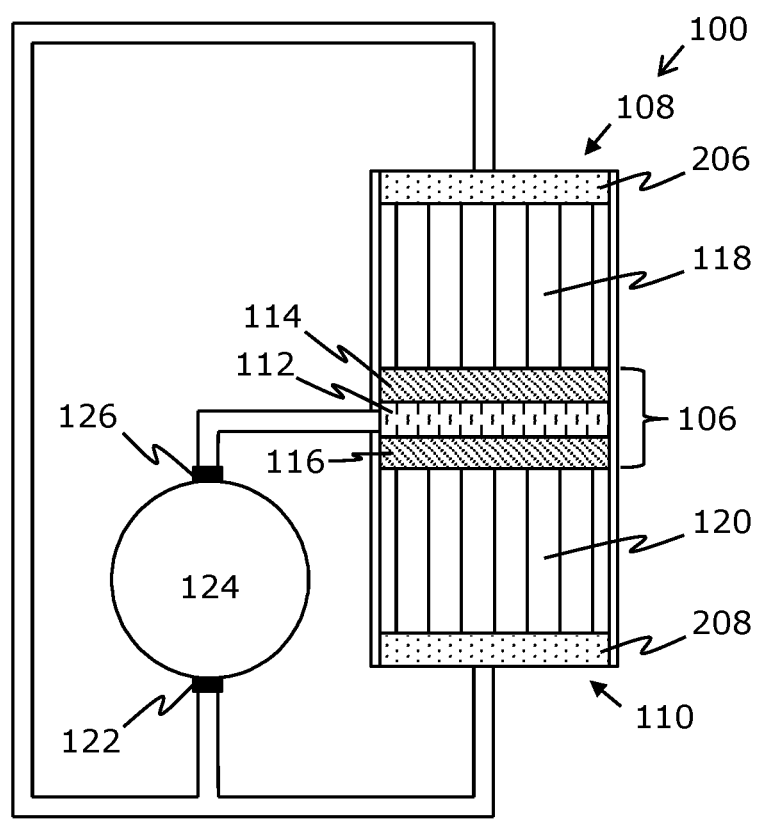
FIG. 1 is a schematic illustration of a plate-type ozone generator, according to an example embodiment of the teachings herein.

Referring to FIG. 1, illustrated is a plate-type ozone generator 100, according to an example embodiment of the teachings herein. The plate-type ozone generator 100 comprises a first ground electrode plate 206 (depicted as a dotted pattern), a second ground electrode plate 208 (depicted as a dotted pattern), a central plate (not shown), and a reactor middle frame 106. The first ground electrode plate 206 is arranged at a first end 108 of the plate-type ozone generator 100. The second ground electrode plate 208 is arranged at a second end 110 of the plate-type ozone generator 100. The central plate and the reactor middle frame 106 are arranged in between the first end 108 and the second end 110 at a first predefined distance from both the first ground electrode plate 206 and the second ground electrode plate 208. The central plate and the reactor middle frame 106 are parallel to both the first ground electrode plate 206 and the second ground electrode plate 208. The central plate has a through-hole (not shown) to house the reactor middle frame 106 that is arranged at a centre of the central plate and is moveable up to a second predefined distance from the centre. The reactor middle frame 106 comprises a high-voltage electrode plate 112 (depicted as a vertical stripes pattern) that is parallelly arranged between a first dielectric barrier plate 114 (depicted as a diagonal stripes pattern) and a second dielectric barrier plate 116 (depicted as a diagonal stripes pattern). A first gap 118 is formed between the first dielectric barrier plate 114 and the first ground electrode plate 206 and a second gap 120 is formed between the second dielectric barrier plate 116 and the second ground electrode plate 208. A first terminal 122 of a power source 124 is shown connected to both the first ground electrode plate 206 and the second ground electrode plate 208, and a second terminal 126 of the power source 124 is shown connected to the high-voltage electrode plate 112. When the plate-type ozone generator 100 is in operation, the first gap 118 and the second gap 120 are filled with a gas (not shown), the power source 124 is used to charge the first ground electrode plate 206, the second ground electrode plate 208, and the high-voltage electrode plate 112, and a dielectric barrier discharge (DBD) occurs to ionize the gas for generating ozone.

It may be understood by a person skilled in the art that the FIG. 1 is a schematic illustration of the plate-type ozone generator 100 for sake of clarity, which should not unduly limit the scope of the claims herein. It is not drawn to scale. The person skilled in the art will recognize many variations, alternatives, and modifications of embodiments of the present disclosure.

The "plate-type ozone generator" is an equipment that is used for generating the ozone by converting oxygen (that is present in the gas) into the ozone. It is characterized by having parallel plates supplied with a high voltage that causes ionization of gas between them. The generated ozone may be used, for example, in water treatment, air treatment, food sanitation, paper production, aquaculture, medicine, disinfection treatment, deodorization, agriculture, electronics, and the like.

When the power source 124 charges the first ground electrode plate 206, the second ground electrode plate 208, and the high-voltage electrode plate 112, the high-voltage electrode plate 112 modifies (namely, adjusts) polarities of the first dielectric barrier plate 114 and the second dielectric barrier plate 116. Once the polarities are requisitely modified, electric fields are created in the first gap 118 and the second gap 120, and when magnitudes of the electric fields reach a predefined threshold magnitude, the gas that is filled in the first gap 118 and the second gap 120 ionizes to generate the DBD (namely, a plasma or a spontaneous electron avalanche). It will be appreciated that the predefined threshold magnitude depends on a pressure of the gas, a moisture content in the gas, a composition of the gas, and the like. In an embodiment, the power source 124 is a high-voltage alternating current (AC) generator. In an embodiment, the gas is one of: oxygen, dry air. In this regard, the DBD comprises nascent oxygen atoms which are highly unstable. Therefore, these nascent oxygen atoms bond (namely, combine) with abundantly available oxygen molecules in the gas, to generate the ozone. The oxygen is often preferred over the dry air because a yield of the ozone generated using the oxygen is considerably greater than a yield of the ozone generated using the dry air (since a percentage of the oxygen in the dry air is low, such as approximately equal to 20 percent).

In an embodiment, the first predefined distance lies in a range of 0.05 millimetres to 3 millimetres. As an example, the first predefined distance may be from 0.05, 0.1, 0.15, 0.2, 0.25, 0.3, 0.35, 0.4, 0.45, 0.5, 0.6, 0.7, 0.8, 1 or 1.5 millimetres up to 0.25, 0.35, 0.45, 0.55, 1, 1.5, 2, 2.5 or 3 millimetres. In an embodiment, the second predefined distance lies in a range of 0 millimetres to 2 millimetres. As an example, the second predefined distance may be from 0, 0.25, 0.5, 0.75 or 1 millimetre up to 0.5, 0.85, 1.25, 1.75 or 2 millimetres.

When the first ground electrode plate 206, the second ground electrode plate 208, and the high-voltage electrode plate 112 are charged using the power source 124, an electrostatic force of attraction occurs between the first ground electrode plate 206 and the high-voltage electrode plate 112, and between the second ground electrode plate 208 and the high-voltage electrode plate 112. Typically, the electrostatic force of attraction is directly related to a square of a voltage of the power source 124 and is indirectly (i.e., inversely) related to a square of a distance between a given ground electrode plate and the high-voltage electrode plate 112. Notably, the given ground electrode plate refers to the first ground electrode plate 206, or the second ground electrode plate 208, or both. It will be appreciated that an arrangement of the high-voltage electrode plate 112 in between (back-to-back) two ground electrode plates (notably, the first ground electrode plate 206 and the second ground electrode plate 208) enables in providing stability to the high-voltage electrode plate 112 when the plate-type ozone generator 100 is in operation. This is because the electrostatic force of attraction is uniformly distributed on both sides of the high-voltage electrode plate 112. In other words, the electrostatic force of attraction on the high-voltage electrode plate 112 is counterbalanced due to said arrangement, thereby preventing the high-voltage electrode plate 112 from wobbling (or buckling). Since the reactor middle frame 106 is not attached with the central plate during assembly, the reactor middle frame 106 is self-adjusting within the plate-type ozone generator 100. Notably, a movement of the reactor middle frame 106 is constrained along a longitudinal axis of the plate-type ozone generator 100 up to the second predefined distance. It will be appreciated that the position of the reactor middle frame 106 is requisitely adjusted and subsequently fixed, for use. Notably, the given dielectric barrier plate refers to the first dielectric barrier plate 114, or the second dielectric barrier plate 116, or both.

It may be understood that the central plate is to be considered as a mounting plate for the reactor middle frame 106. In some implementations, the high-voltage electrode plate 112, the first dielectric barrier plate 114 and the second dielectric barrier plate 116 are fabricated as separate elements and then assembled together to form the reactor middle frame 106. In other implementations, the high-voltage electrode plate 112, the first dielectric barrier plate 114 and the second dielectric barrier plate 116 are fabricated as integrally to form the reactor middle frame 106. In an embodiment, a material of the high-voltage electrode plate is one of: stainless steel, brass, aluminium, duralumin.

In an embodiment, a diameter of the given ground electrode plate lies in a range of 100 to 200 mm, more preferably 130 to 160 mm. In an embodiment, a thickness of the given ground electrode plate lies in a range of 0.5 to 2 mm, preferably about 1 mm. Furthermore, the ground electrode plate is circular with diameter lying in the range 140 to 150 mm. In an embodiment, a length of the central plate lies in a range of 100 to 300 mm. In an embodiment, a width of the central plate lies in a range of 100 to 300 mm. In an embodiment, a thickness of the central plate lies in a range of 5 mm to 20 mm. Preferably, the central plate is square, with a length and width of about 200 mm and a thickness of about 10 mm.

In an embodiment, the given dielectric barrier plate is arranged in a proximity of the high-voltage electrode plate 112. In other words, the given dielectric barrier plate is arranged adjacent to the high-voltage electrode plate 112. In some implementations, the given dielectric barrier plate is arranged in contact (as shown in FIG. 1) with the high-voltage electrode plate 112. In other implementations, the given dielectric barrier plate is arranged at a given distance from the high-voltage electrode plate 112. In an embodiment, a material of the given dielectric barrier plate is one of: a ceramic, a polymer, silicon dioxide (SO2), silicon oxynitride (SiOxNy), silicon nitride (Si3N4). The given "dielectric barrier plate" is an electrical insulator which can be polarized when placed in an electric field. In an embodiment, a thickness of the given dielectric barrier plate lies in a range of 500 micrometres to 670 micrometres. As an example, the thickness of the given dielectric barrier plate may be from 500, 510, 520, 530, 550, 570 or 590 micrometres up to 550, 580, 610, 640 or 670 micrometres. It will be appreciated that the given dielectric barrier plate prevents an occurrence of a continuous arc discharge, and facilitates in generation of a plurality of plasma filaments (for example, depicted as vertical lines in the first gap 118 and the second gap 120) between the given ground electrode plate and the high-voltage electrode plate 112. Such plasma filaments have a very short lifetime (typically, in order of a few nanoseconds). This is because, in the DBD, charge carriers are accumulated on a surface of the given dielectric barrier plate and generate an electric field that is opposite to an electrical field generated between the given ground electrode plate and the high-voltage electrode plate 112. Therefore, the plurality of plasma filaments are generated in a discontinuous manner.

Figure 2:
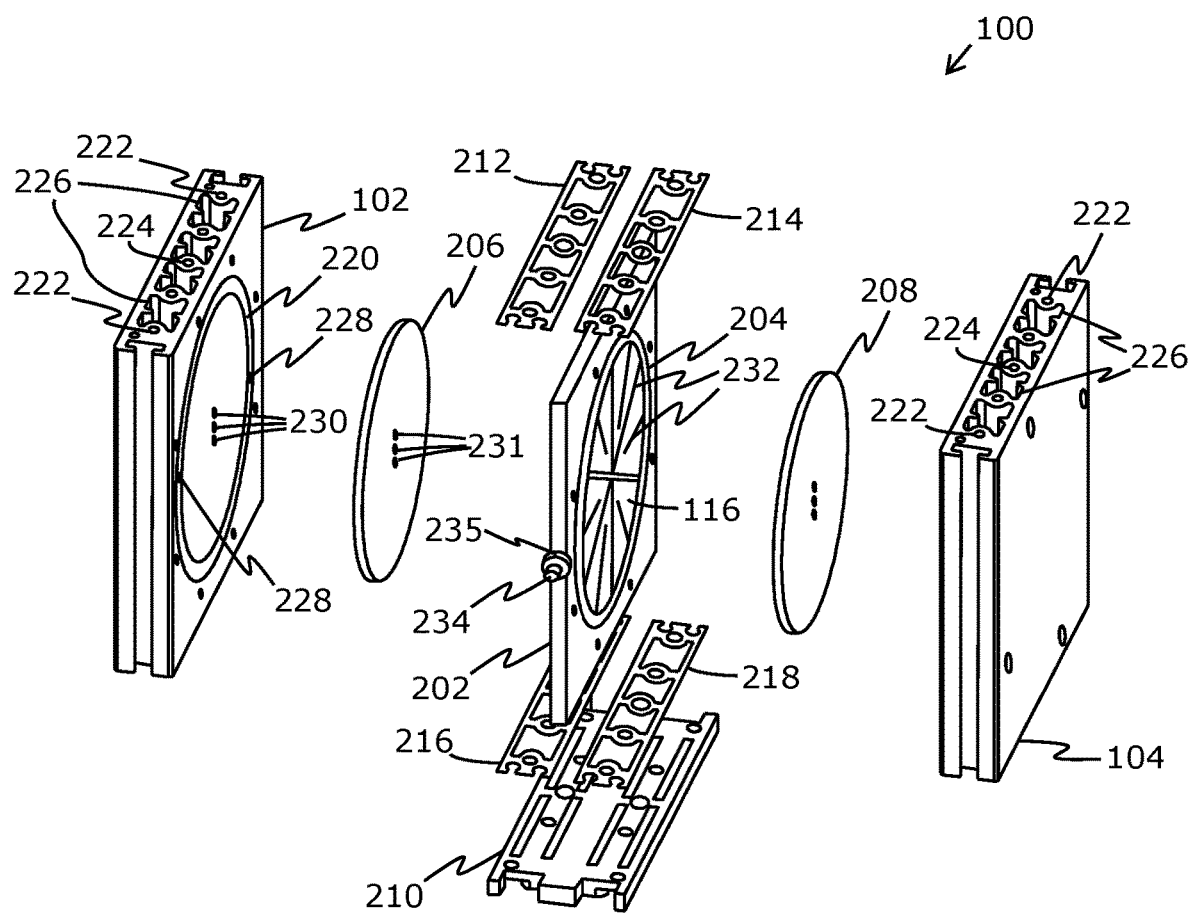
FIG. 2 illustrates an exploded view of a plate-type ozone generator, according to an example embodiment of the teachings herein.

Referring to FIG. 2, illustrated is an exploded view of the plate-type ozone generator 100, according to an example embodiment of the teachings herein. The exploded view represents a central plate 202 of the plate-type ozone generator 100, in addition to some other elements of the plate-type ozone generator 100 already shown in FIG. 1. The central plate 202 and the reactor middle frame 106 are arranged in between the first ground electrode plate 206 and the second ground electrode plate 208. The central plate 202 and the reactor middle frame 106 are parallel to both the first ground electrode plate 206 and the second ground electrode plate 208. The central plate 202 has a through-hole 204 to house the reactor middle frame 106 that is arranged at the centre of the central plate 202 and is (longitudinally) moveable from the centre. In an embodiment, the plate-type ozone generator 100 further comprises a mounting arrangement for assembling all the elements of the plate-type ozone generator 100. The mounting arrangement comprises a lock plate 210 upon which said elements are assembled, and four slotted seals 212, 214, 216, and 218 for sealing the first ground plate cooling manifold 102 and the second ground plate cooling manifold 104.

It may be understood by a person skilled in the art that the FIG. 2 is a detailed exploded view of the plate-type ozone generator 100 for sake of clarity, which should not unduly limit the scope of the claims herein. The person skilled in the art will recognize many variations, alternatives, and modifications of embodiments of the present disclosure.

In some implementations, the through-hole 204 in the central plate 202 is a central through-hole. In other implementations, the through-hole 204 in the central plate 202 is not a central through-hole. It will be appreciated that a size of the through-hole 204 in the central plate 202 is slightly greater than a size of the reactor middle frame 106 to enable ease in movement of the reactor middle frame 106.

In an embodiment, the high-voltage electrode plate 112 and the given dielectric barrier plate are circular in shape, the given ground plate cooling manifold has an annular recess 220 therein, and wherein a diameter of the given dielectric barrier plate is greater than a diameter of the high-voltage electrode plate 112 and an outer diameter of the annular recess 220 of the given ground plate cooling manifold. The technical benefit of having circular shapes of the high-voltage electrode plate 112 and the given dielectric barrier plate is that the reactor middle frame 106 is easily moveable (namely, floatable) within the through-hole 204 of the central plate 202. The technical benefit of having the annular recess 220 in the given ground plate cooling manifold is that the annular recess 220 facilitates in providing a uniform distribution of the gas into the first gap 118 and the second gap 120. The technical benefit of having the diameter of the given dielectric barrier plate greater than the diameter of the high-voltage electrode plate 112 and the outer diameter of the annular recess 220 is that the given dielectric barrier plate efficiently covers a region of the DBD, and prevents an occurrence of a continuous arc discharge. This facilitates in generation of a plurality of plasma filaments between the given ground electrode plate and the high-voltage electrode plate.

In an embodiment, the given ground plate cooling manifold is fabricated as a metallic frame, wherein the metallic frame comprises:
  a plurality of conduits 222 and 224 for at least supplying the gas into the first gap 118 and the second gap 120 within the plate-type ozone generator 100 and obtaining the ozone from the plate-type ozone generator 100; and
  a plurality of channels 226 for circulating water or air to cool the plate-type ozone generator 100.

In an embodiment, the metallic frame is implemented as an aluminium frame or an aluminium alloy frame. It will be appreciated that the metallic frame is fabricated by employing at least one of: an extrusion technique, a pressing technique, a machining technique. This enables in obtaining efficient designs of the plurality of conduits 222 and 224 and the plurality of channels 226 within the metallic frame in terms of accurate flow paths for the gas, the ozone, and the water or air circulation. Such a design considerably decreases an assembling time for the plate-type ozone generator 100.

As an example, the conduits 222 (as shown in FIG. 2) are used for supplying the gas into the first gap 118 and the second gap 120, and the conduits 224 (as shown in FIG. 2) are used for obtaining the ozone from the plate-type ozone generator 100. Additional through holes (not labelled) may be provided to facilitate mounting the ozone generator in a system for generating ozone. In an embodiment, a given conduit (such as the conduits 222) for supplying the gas is a through-hole conduit. In an embodiment, an outlet portion of the given conduit for supplying the gas opens into the annular recess 220 of the given ground plate cooling manifold via T-junction holes 228 in the annular recess 220. In other words, the gas supplied from the outlet portion of the given conduit travels through the given conduit and exits into the annular recess 220 via the T-junction holes 228. In an embodiment, the generated ozone exits the first gap 118 and the second gap 120 via a set of holes (depicted as a set of three holes 230 in the given ground plate cooling manifold) and an aligned set of holes 231 in a centre of the given ground electrode plate, the set of holes 230 being connected to the conduits 224 for obtaining the ozone. When the plate-type ozone generator 100 is in operation, a heat is produced in the plate-type ozone generator 100. Such a heat is carried away by the water or air circulating in the plurality of channels 226 (depicted as four 'X' shaped channels in the given ground plate cooling manifold), thereby providing effective and sufficient cooling of the plate-type ozone generator 100. Notably, the plurality of channels 226 are through-channels.

In an embodiment, the given dielectric barrier plate comprises a plurality of radial spokes 232 that are spaced apart from each other. It will be appreciated that the radial spokes 232 provide a separation gap in between the given dielectric barrier plate and the given ground electrode plate. Furthermore, the radial spokes 232 facilitate in providing a flow path for the gas via said separation gap in between the given dielectric barrier plate and the given ground electrode plate.

In an embodiment, the central plate 202 comprises an insulated port 234 for providing an electrical connection between the high-voltage electrode plate 112 and the power source 124. In other words, the insulated port 234 defines an electrical contact between the high-voltage electrode plate 112 and the power source 124. In an embodiment, the insulated port 234 is formed on a side surface of the central plate 202. It will be appreciated that the insulated port 234 is implemented as a screw surrounded by a sleeve 235 of a flexible material (such as polytetrafluoroethylene (PTFE) material (namely, Teflon)). The screw ensures a required electrical contact between the high-voltage electrode plate 112 and the power source 124, and prevents unnecessary movement of the high-voltage electrode plate 112 when said plate is in use. A requisite tolerance is provided on the sleeve to protect the screw from high-voltage electrode plate 112. In an embodiment, a power supply cable (such as a wire) is provided from the power source 124 to the high-voltage electrode plate 112 via the insulated port 234. The power supply cable would make a loose contact with the high-voltage electrode plate 112 and thereby allowing for a floating movement of the reactor middle frame 106 without any undesirable arcing.

In an embodiment, the metallic frame is capable of accommodating power supply cables (not shown) and/or the power source 124. It will be appreciated that the metallic frame is fabricated in a manner that the power supply cables and/or the power source 124 could be accommodated by the metallic frame. This facilitates in reducing a distance of the power source 124 from the plate-type ozone generator 100, and in making a compact enclosure for the power source 124, thereby enables in providing enhanced electromagnetic compatibility (EMC) properties.

Figure 3:
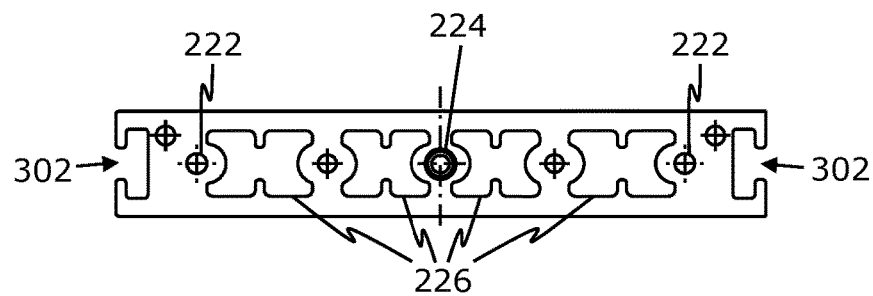
FIG. 3 illustrates a sectional view of a ground plate cooling manifold fabricated as a metallic frame, according to an example embodiment of the teachings herein.

Referring to FIG. 3, illustrated is a sectional view of a given ground plate cooling manifold fabricated as a metallic frame, according to an example embodiment of the teachings herein. The given ground plate cooling manifold could be the first ground plate cooling manifold 102, or the second ground plate cooling manifold 104, or both. The sectional view represents positions (or arrangements) of the plurality of conduits 222 and 224, and the plurality of channels 226 shown in FIG. 2. In an example, diameters of the conduits 222 for supplying the gas may be 6 millimetres. In an example, the conduits 224 for obtaining the ozone may be implemented as ⅛ RC tapped hole conduits. In an example, diameters of the conduits 224 for obtaining the ozone may be 7.9 millimetres. In an example, a distance between any two consecutive conduits may be 35 millimetres. In an example, a depth of a given conduit may lie in a range of 8 millimetres to 18 millimetres. Notably, the given conduit could be the conduits 222 for supplying the gas or the conduits 224 for obtaining the ozone, or both.

In an embodiment, the metallic frame comprises a plurality of t-slots 302 to enable fastening of a plurality of electronic elements (not shown) with the metallic frame. The plurality of electronic elements may comprise a Programable Logic Controller (PLC) circuit, a wire, and the like. In an embodiment, the plurality of t-slots 302 are fabricated at least by an extrusion technique. It will be appreciated that the plurality of t-slots 302 enable in fastening the plurality of electronic elements with the metallic frame without employing a drilling or a welding process. In an embodiment, the metallic frame comprises through-hole conduits for fastening the plurality of electronic elements to the metallic frame.

Figure 4:
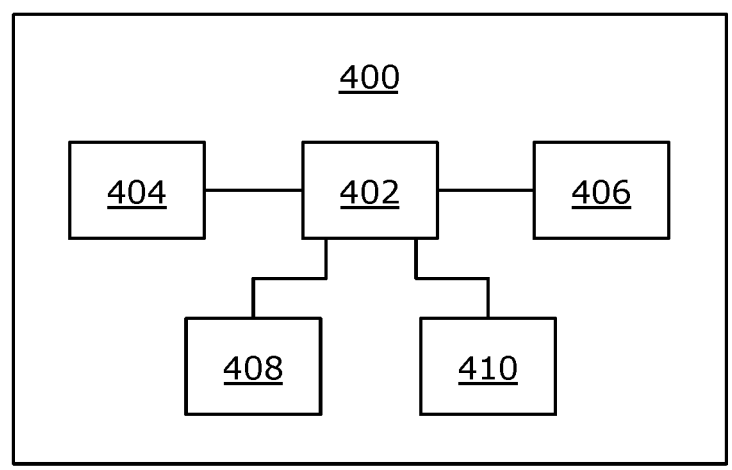
FIG. 4 illustrates a block diagram of architecture of a system for generating ozone, according to an example embodiment of the teachings herein.

Referring to FIG. 4, illustrated is a block diagram of architecture of a system 400 for generating ozone, according to an example embodiment of the herein. The system 400 comprises at least one plate-type ozone generator (depicted as a plate-type ozone generator 402), a gas source 404, a cooling arrangement 406, an ozone collection unit 408, and a power source 410. The plate-type ozone generator 402 is used for generating the ozone. The gas source 404 is used for supplying a gas to be filled into a first gap and a second gap within the plate-type ozone generator 402. The gas source 404 is fluidically coupled to the plate-type ozone generator 402. The cooling arrangement 406 is used for circulating water or air to cool the plate-type ozone generator 402. The ozone collection unit 408 is used for obtaining the ozone from the plate-type ozone generator 402. The ozone collection unit 408 is fluidically coupled to the plate-type ozone generator 402. The power source 410 is used for driving the plate-type ozone generator 402. It will be appreciated that the system 400 utilizes a systematic approach for generating the ozone, wherein multiple plate-type ozone generators could be easily used for a large scale ozone generation. Moreover, such multiple plate-type ozone generators would require minimal assembling time as compared to typical plate-type ozone generators. The positioning of through conduits 222, 224, 226 allows alignment with multiples of replicate generators. In an example, a number of plate-type ozone generators that could be used in the system 400 lies in a range of 1 to 60. The system 400 is reliable and can be implemented with ease.

It may be understood by a person skilled in the art that the FIG. 4 includes a simplified architecture of the system 400 for sake of clarity, which should not unduly limit the scope of the claims herein. The person skilled in the art will recognize many variations, alternatives, and modifications of embodiments of the present disclosure.

The present disclosure also provides a conduit for supplying a gas into a first gap and a second gap within a plate-type ozone generator (such as the plate-type ozone generator 100), wherein the conduit is formed in a ground plate cooling manifold of the plate-type ozone generator and the ground plate cooling manifold is fabricated as a metallic frame. Such a conduit is depicted, for example, as conduits 222 in the FIG. 2.

The present disclosure also provides a conduit for obtaining ozone from a plate-type ozone generator (such as the plate-type ozone generator 100), wherein the conduit is formed in a ground plate cooling manifold of the plate-type ozone generator and the ground plate cooling manifold is fabricated as a metallic frame. Such a conduit is depicted, for example, as conduits 224 in the FIG. 2.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A plate-type ozone generator comprising:
a first ground electrode plate arranged at a first end of the plate-type ozone generator, a second ground electrode plate arranged at a second end of the plate-type ozone generator, a central plate and a reactor middle frame arranged in between the first end and the second end at a first predefined distance from both the first ground electrode plate and the second ground electrode plate, the central plate and the reactor middle frame being parallel to both the first ground electrode plate and the second ground electrode plate, wherein the central plate has a through-hole to house the reactor middle frame that is arranged at a centre of the central plate and is moveable up to a second predefined distance from the centre, the reactor middle frame comprises a high-voltage electrode plate parallelly arranged between a first dielectric barrier plate and a second dielectric barrier plate, a first gap being formed between the first dielectric barrier plate and the first ground electrode plate and a second gap being formed between the second dielectric barrier plate and the second ground electrode plate,
further wherein when the plate-type ozone generator is in operation, the first gap and the second gap are filled with a gas, a power source is used to charge the first ground electrode plate, the second ground electrode plate, and the high-voltage electrode plate, and a dielectric barrier discharge (DBD) occurs to ionize the gas for generating ozone.

2. The plate-type ozone generator according to claim 1, wherein a given dielectric barrier plate is arranged in a proximity of the high-voltage electrode plate.

3. The plate-type ozone generator according to claim 1, wherein the high-voltage electrode plate and a given dielectric barrier plate are circular in shape, a given ground electrode plate has an annular recess therein, and wherein a diameter of the given dielectric barrier plate is greater than a diameter of the high-voltage electrode plate and an outer diameter of the annular recess of the given ground electrode plate.

4. The plate-type ozone generator according to claim 3, wherein the given dielectric barrier plate comprises a plurality of radial spokes that are spaced apart from each other.

5. The plate-type ozone generator according to claim 1, wherein the central plate comprises an insulated port for providing an electrical connection between the high-voltage electrode plate and the power source.

6. The plate-type ozone generator according to claim 1, wherein a given ground electrode plate is fabricated as a metallic frame, wherein the metallic frame comprises:
 a plurality of conduits for at least supplying the gas into the first gap and the second gap within the plate-type ozone generator and obtaining the ozone from the plate-type ozone generator; and
 a plurality of channels for circulating water or air to cool the plate-type ozone generator.

7. A plate-type ozone generator according to claim 6, wherein the metallic frame is capable of accommodating power supply cables and/or the power source.

8. The plate-type ozone generator according to claim 6, wherein the metallic frame comprises a plurality of t-slots to enable fastening of a plurality of electronic elements with the metallic frame.

9. A plate-type ozone generator comprising:
 a ground plate cooling manifold, a ground electrode plate, a dielectric barrier plate, a high voltage electrode plate, arranged in sequence and each parallel to each other;
 the ground plate cooling manifold comprising inlet and outlet conduits extending therethrough and parallel to the plane of the ground plate cooling manifold,
 the ground plate cooling plate having an annular recess and at least one central hole, each on the side facing the high voltage electrode plate,
 the ground electrode plate being disc shaped and sized to fit within the ambit of the annular recess and having at least one central plate hole arranged to be in alignment with the at least one central hole, the ground electrode plate being arranged in contact with the ground plate cooling plate,
 the inlet conduit having a 'T' junction with a recess conduit that communicates with the annular recess,
 the outlet conduit having a 'T' junction with the at least one central hole,
 the dielectric plate having radial spokes defining through passages communicating between the annular recess and the at least one central plate hole.

10. A plate-type ozone generator according to claim 9, further comprising a second ground plate cooling manifold, a second ground electrode plate, and a second dielectric barrier plate constructed and arranged to mirror the plate-type ozone generator of claim 9 about the high voltage electrode plate.

11. The plate-type ozone generator according to claim 9, in which the ground plate cooling manifold is fabricated from a metallic extrusion.

12. A system for generating ozone, the system comprising:
 at least one plate-type ozone generator according to claim 1;
 a gas source for supplying a gas to be filled into at least a first gap between the ground electrode plate and the dielectric barrier plate within the at least one plate-type ozone generator, the gas source being fluidically coupled to the at least one plate-type ozone generator;
 a cooling arrangement for circulating water or air to cool the at least one plate-type ozone generator;
 an ozone collection unit for obtaining the ozone from the at least one plate-type ozone generator, the ozone collection unit being fluidically coupled to the at least one plate-type ozone generator; and
 a power source for driving the at least one plate-type ozone generator.

* * * * *